Jan. 5, 1960 R. T. WHEELER 2,919,469
APPARATUS FOR INJECTION MOLDING
Filed July 3, 1957 3 Sheets-Sheet 1
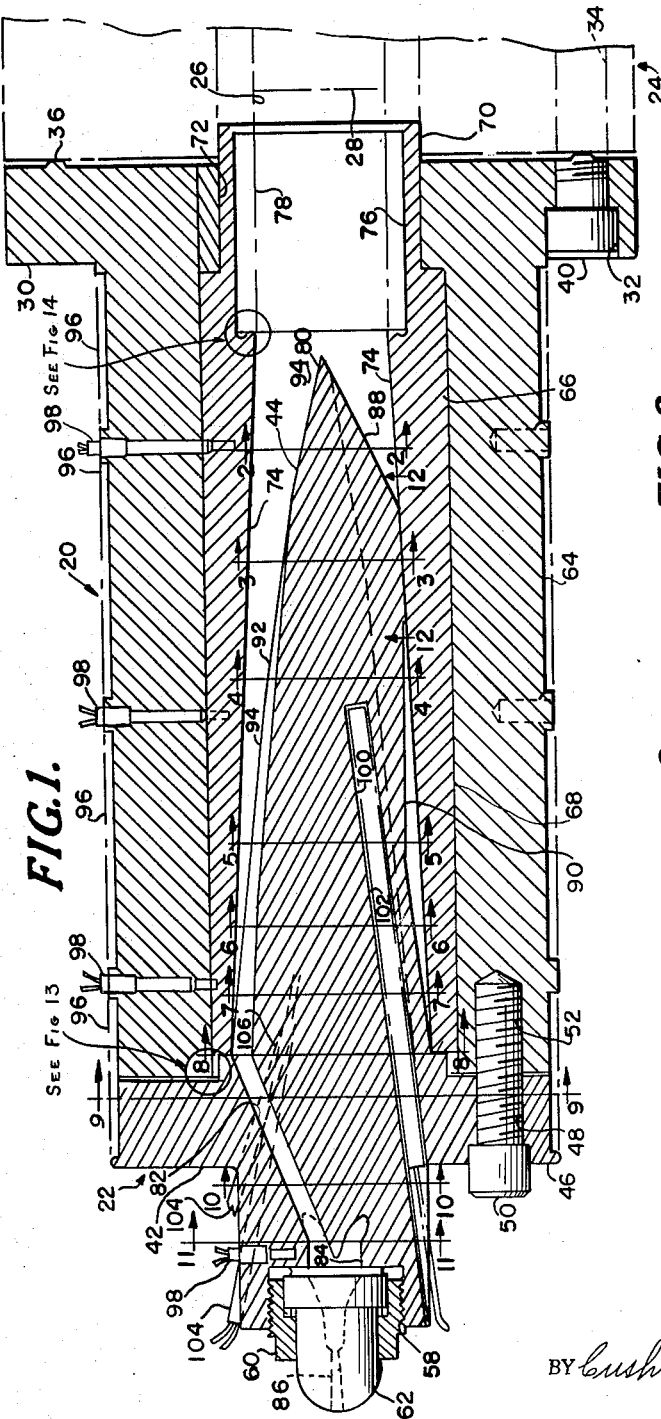
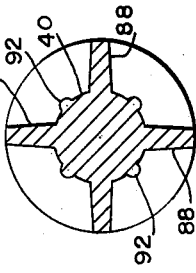
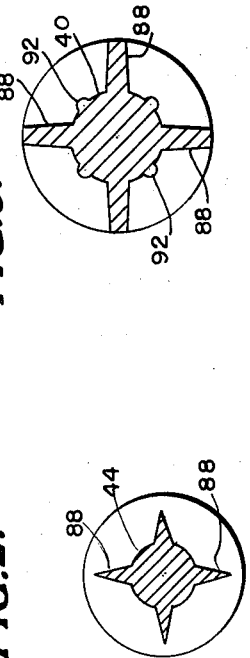
INVENTOR
RAYMOND T. WHEELER
BY Cushman, Darby & Cushman
ATTORNEYS

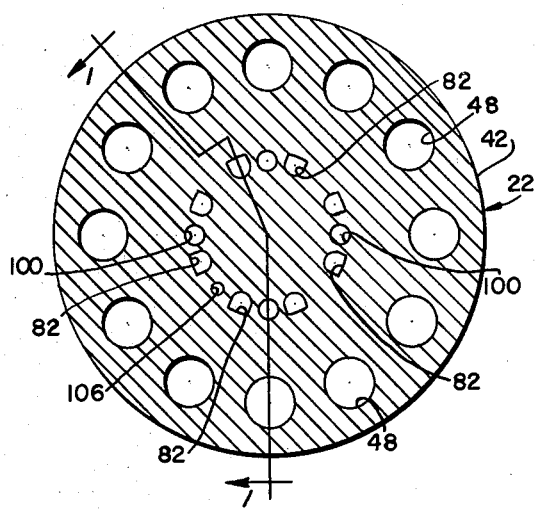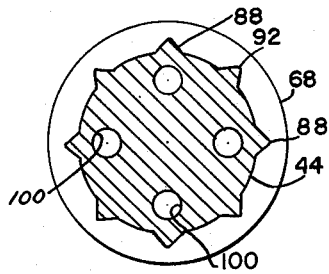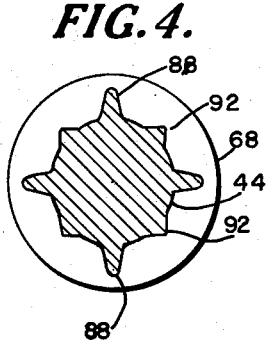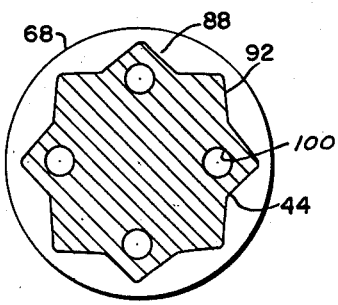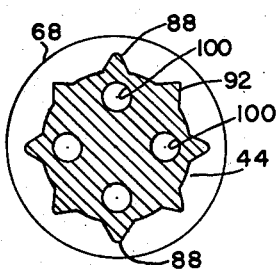

Jan. 5, 1960 R. T. WHEELER 2,919,469
APPARATUS FOR INJECTION MOLDING
Filed July 3, 1957 3 Sheets-Sheet 3

INVENTOR
RAYMOND T. WHEELER

BY Cushman, Darby & Cushman
ATTORNEYS

United States Patent Office 2,919,469
Patented Jan. 5, 1960

2,919,469

APPARATUS FOR INJECTION MOLDING

Raymond T. Wheeler, Normandy, Mo., assignor to Crown Cork & Seal Company, Inc., Baltimore, Md., a corporation of New York Application July 3, 1957, Serial No. 669,751

2 Claims. (Cl. 18—30)

The present invention relates to apparatus for injection molding of various plastics, and more particularly, to the heating means for changing the plastic material from a solid state to a liquefied or viscous state during its transfer through the apparatus to a mold.

Injection molding apparatus generally include a delivery device having a pressure cylinder for receiving a charge of a solid plastic material and a ram or piston for transferring the charge of material to a heating chamber. The plastic material is transferred through the heating chamber and is plasticized into a liquid or viscous state. From the heating chamber the plastic material is then flowed to the nozzle of the apparatus which injects the liquid plastic into a mold.

Heretofore injection molding apparatus have been provided with heating chambers having spreaders which would spread the solid plastic material as the material was being transferred and transformed into its liquid state. Difficulties have been experienced in that solid particles remained suspended in the plastic material after it was liquefied. Further, prior chambers were provided with obstructions, upon which the plastic material would stick and decompose. The rapid changes in area within the heating chamber caused pressure drops across the heating chamber of approximately 50 to 90% of the injection pressure, depending on the plastic being molded. In other heating chambers, rapid decreases in cross-sectional area within the chamber caused excessive friction which decreased the amount of pressure transmitted through the chamber.

An object of the present invention is to provide an apparatus for injection molding having a heating chamber wherein the plastic material in a solid state is changed to a liquid or viscous state with a minimum loss of injection pressure and a minimum loss of time of transferring the plastic from one end to the other. It is objectionable to lose pressure in the heating device as the loss decreases the effective pressure in the mold needed to obtain complete molded pieces, and further, it is objectionable to subject the plastic material to heat for too long a period of time, as the material will decompose.

Another object of the present invention is to provide injection molding apparatus capable of use with plastics such as rigid polyvinyl acetate, as well as other plastics, such as polystyrene or the like.

In prior apparatus, plastic material being transferred through the heat chamber stayed in the same relative position as it was changed from a solid to a liquid state. Since plastic material, in itself, is an insulator, the plastic near the heating surfaces would melt but would insulate the plastic in the center of the mass from the heat. Consequently, some of the plastic in the center of the mass would not melt. To overcome this, high temperatures were used at the heating surfaces, as well as longer periods of time of application of heat to the plastic were tried. In each instance the plastic next to the heating surface became excessively heated and tended to decompose, while the remainder of the plastic came up to the proper temperature. Efforts have been made to change the direction of flow of material through the heating chamber by providing baffles or tortuous paths for the plastic so that solid particles suspended in the liquid plastic would engage the heating surfaces. Such means has been found unsatisfactory in that pressure drops across the heating chamber resulted and, further, such means provided blind spots where the plastic would stick and decompose due to loss in pressure caused by rapidly increasing cross-sectional area.

A further object of the present invention is to provide a heating chamber for an injection molding apparatus wherein the material is moved in a generally longitudinal direction through the chamber but wherein a milling action is provided in the plastic flow, causing the more fluid melted plastic to move leaving the solid particles exposed to the heating surfaces.

Still another object of the present invention is to provide an injection molding apparatus with a heating chamber having a greater heating area to speed plasticizing of the plastic material and which is capable of handling a larger effective volume of material in a less amount of time.

These and other objects of the present invention will be more apparent from the following specification, claims and drawings, in which:

Figure 1 is a longitudinal sectional view through the heating chamber of an injection molding apparatus, the view being taken on the lines 1—1 of Figure 9.

Figures 2 through 11 are enlarged transverse sectional views taken on the lines 2—2 to 11—11 respectively of Figure 1.

Figure 12 is an enlarged sectional view through a locating fin of the torpedo member, taken on the line 12—12 of Figure 1.

Figure 11:
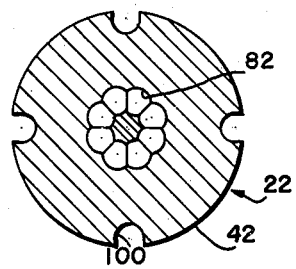
Figure 10:
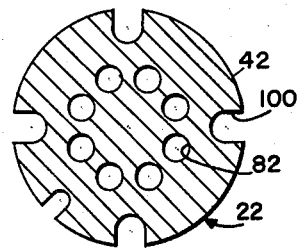

Referring specifically to the drawings, where like characters or reference numerals represent like or similar parts, the present invention includes a heating cylinder generally designated by the numeral 20, a torpedo member generally designated by the numeral 22 and a plastic charge delivering device shown in dotted lines and generally designated by the numeral 24. The delivering device 24 is of the type which is provided with a feed bushing 26 and a ram or piston 28 reciprocable within the bushing to move a charge into the heating cylinder 20. The charge may be a cylindrical slug of plastic material or granulated particles of plastic material to be moved and, further, the delivering device 24 may have means to deliver a measured charge to feed bushing 26, as is known in the art.

Figure 13:
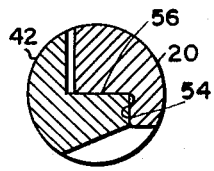
Figure 13 is an enlarged fragmentary section encircled and identified on Figure 1.

Cylinder 20 is provided with a flange 30 at one end thereof, the flange being provided with a plurality of holes 32 about its periphery, which are adapted to align with threaded holes 34 in the delivering device 24. The flange may be provided with a circumferential ridge 36 which is seated against the delivering or feed mechanism 24 leaving an air gap between the flange and the feed mechanism so as to insulate the heating chamber from the feed mechanism by reducing the heat transfer surface. A plurality of bolts or studs 40, provided in the holes 32, are adapted to tightly clamp the cylinder 20 to the delivery device 24. Torpedo member 22 is provided with an enlarged head portion 42 and a body portion 44. The enlarged head portion 42 includes a flange 46 having a plurality of apertures or holes 48 spaced about its periphery through which bolts or studs 50 may be passed and threaded into threaded holes 52 provided in the end of heating cylinder 20. As best shown in Figure 13, the heating cylinder 20 is recessed, as indicated at 54, whereas the abutting end of the enlarged head portion 42 is provided with a projection 56 that sets into the recess and properly aligns the torpedo member 22 with the heating cylinder 20. The reduced area of the recess 54 will tend to compress when the torpedo member 22 is assembled on the heating cylinder 20, thus providing a good seal between the parts. The body portion 44 of torpedo member 22 extends axially inwardly of the heating cylinder 20 toward the delivery device 24. The forward end of the torpedo member is provided with a threaded recess 58 which is adapted to receive a lock nut 60 that holds a nozzle tip 62 tightly in position on the torpedo member 22.

Heating cylinder 20 is preferably made of an outer shell 64 having a cylindrical bore 66 therethrough and an inner sleeve 68 provided within the bore 66. The sleeve 68 may be reduced at one end, as indicated at 70, so as to fit into the reduced portion 72 of the bore 66, and align the heating cylinder 20 with the feed mechanism 24 by piloting in the bore for the feed bushing 26. The liner or sleeve 68 is made from a corrosion resistant material capable of withstanding the temperatures necessary to melt the plastic molding material. Although the heating cylinder 20 is shown as made of two pieces, it is of course within the scope of the present invention that the unit could be machined, cast or forged from a solid block of corrosion resistant material if corrosion resistance is needed or otherwise from a high strength steel.

Figure 14:
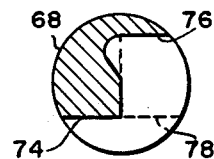
Figure 14 is an enlarged fragmentary section encircled and identified on Figure 1.

Sleeve 68 is provided with a frusto-conical passage 74 therethrough which has a diameter at its smallest end equal to the diameter of the feed bushing 26. As shown in Figures 1 and 14, the sleeve 68 is counterbored, as indicated at 76, the counterbore being adapted to receive the end portion 78 of the feed bushing 26, and insure a good seal between the two parts.

Figure 8:
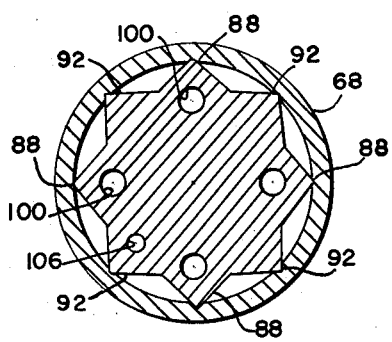

The body portion 44 of torpedo member 22 is conically shaped with its apex end 80 of the cone being positioned on the longitudinal axis of the frusto-conical passage 74 adjacent the smallest diameter of the same. The base of the cone-shaped body portion 44 is positioned adjacent the base of the frusto-conical passage 74 and it will be noted that the base of the body portion 44 has a diameter less than the diameter of the base of the frusto-conical passage 74. The wall of the frusto-conical passage 74 has a shallower pitch than the outer surface of the conical body portion 44 of the torpedo member 22, and, consequently, the distance between the surface of body portion 44 and the surface of the wall 74 increases in a direction toward the ram or piston 28. At the point where the body portion 44 joins the head portion 42, a plurality of holes 82 leading from the periphery of the body portion 44 extend forwardly of the torpedo member 22 and converge inwardly toward a port 84 on the longitudinal axis of the device. The port 84 is in axial alignment with a passageway 86 through the nozzle tip 62. The holes or bores 82 are evenly spaced about the longitudinal axis of the torpedo member and the accumulative area of the holes 82 at the section shown in Figure 8 is substantially equal to the transverse sectional area of the passageway 73 leading into the heating cylinder, and the sectional area of the holes is reduced throughout the length of said holes to that of the port 84 at the section shown in Figure 11.

Four radially extending locating fins 88 are provided on the body portion 44 of torpedo member 22 adjacent its apex 80. The fins 88 fair sharply into the apex 80 and fair gently into the surface of the body member 44, as indicated at 90. A longitudinal section through the fins 88 is streamline in shape where they contact the frusto-conical passage, as shown in Figure 12. It will be noted from the transverse sections shown in Figures 2 to 8, that the fins 88 fair gently longitudinally along the body portion 44 to a position intermediate of the openings of the bores 82 so that there is a smooth transition into the bores 82. The fins 88 primarily serve to locate and support the end of the body member 44 within the frusto-conical passage 74 of heating cylinder 20, and help prevent a rapid change of cross-sectional area behind the locating section of the fins.

Since there are eight bores 82, four longitudinal ribs 92 are also provided intermediate the fins 88. The number of the holes 82 is equal to the sum of the number of fins 88 and ribs 92, but may be of any number of three or larger in multiples of two or three. The ribs 92 fair outwardly along the body portion 44 as they approach the junction of the body portion with the head portion 42 of torpedo member 22, as best shown in Figures 3 to 8. The ribs, like the fins, provide a smooth surface leading into the openings of the bores 82 at the junction of the body portion 44 and the head portion 42, and help control the cross-sectional area of any rapid changes and at the same time increase the surface area of the torpedo body 44.

The area between the outer surface of the body portion 44 and the inner surface of the frusto-conical passage 74 define an annular heating chamber 94. The transverse sectional area of the annular heating chamber 94 is substantially the same from the apex 80 of the body portion 44 to the point where the body portion 44 joins the head portion 42. This cross-sectional area of the chamber is also substantially equal to the cross-sectional area of the feed bushing 26. The ribs 92 and fins 88 are so designed, in accordance with the pitch of the body portion 44 and the frusto-conical passage 74, that the cross-sectional area is substantially constant throughout the longitudinal length of the body member 44. Although the cross-sectional area of the chamber 94 is constant at any point along the longitudinal axis, the surface area of the chamber increases from the injection end of heating cylinder 20 toward the head portion 42 of the torpedo member 22. As will be explained later in the specification, maintaining the heating chamber 94 with a substantially constant transverse cross-sectional area while increasing the heating surfaces of same longitudinally along the cylinder, provides a milling action of the plastic material as it is being transferred and changed from a solid to a liquefied or viscous state.

The outer periphery of heating cylinder 20 and torpedo member 22 is provided with band-type heaters or the like, 96, for applying heat to the surface of the frusto-conical passage 74 and the holes 82. A plurality of thermocouples 98, longitudinally spaced along the cylinder 20 and the torpedo member 22, provide heating zones and control the temperatures of the heating bands or elements 96. The thermocouples 98 are each positioned an equal distance from the heating surface and thereby a more uniform heat control can be maintained.

Torpedo member 22 is provided with a plurality of bores 100 extending obliquely inwardly from the forward or nozzle end of the device and parallel to the torpedo surface 44 in the sections where located. The bores 100 are each adapted to receive tubular heaters 102 shown in dotted lines. The heaters 102 are immersed in zinc or some like substance to insure a good conductance of heat from the heaters 102 to the bore surfaces 100. The heaters 102 apply heat to the surface of the body portion 44, as well as to the bores 82 in the head portion 42. A thermocouple 104, provided in an obliquely inwardly extending bore 106 provides a control for the heat given off by the tubular heaters 102. The thermocouple 104 is positioned a distance away from the surface of the body portion 44 equal to the distances which the thermocouples 98 are positioned away from their respective heating surfaces.

The operation of the device is as follows: a cylindrical slug or a measured charge of granulated plastic material, in a solid state, is delivered by the piston or ram 28 to the heating chamber 94. Upon entering the heating chamber 94, the plastic material is spread by the apex of the body portion 44 of the torpedo member 22. The portions of the charge of material in contact with the surface of the frusto-conical passageway 74 and the body portion 44 will melt as the charge is progressively advanced through the device. However, a milling action within the charge is set up because the heating surface becomes larger as the charge advances through the device. The melted portion of the plastic next to the heating surfaces of the torpedo and the frusto-conical passage, by being submitted to a unilateral wedging action, caused by the decrease in distance between the walls, will be forced ahead in the direction of mass flow, ninety degrees to direction of mass flow, and into any voids between the solid particles in the center of the mass, every time the pressure operated ram 28 injects more plastic into the heating chamber, which will consequently leave the more solid particles next to the heating surfaces which will then melt. Due to the larger diameters of both the torpedo and the frusto-conical passageway, there is little or no resistance to the melted plastic flowing ninety degrees to the mass flow. Since the transverse cross-sectional area of the annular passageway does not vary, there is no appreciable loss in injection pressure across the device. By the time the charge reaches the junction of the body portion 44 and the head portion 42 of the torpedo 22, it will be in a completely liquid state and will be transferred through the converging bores 82 to the port 84 and passageway 86 in the nozzle tip 62. Since the material is in a completely liquid state by the time it enters the bores 82, it is not necessary to heat the head portion 42 as much as the body portion 44 or the frusto-conical passageway 74. It is only necessary to apply enough heat in the head portion to retain the latent heat of the liquid plastic. By being able to reduce the heat in the forward portion of the device, the possibility of decomposition of the plastic charge is obviated in that area while the lack of any rapid changes in cross-sectional area in the other areas obviates any blind spots where the plastic can possibly decompose. As is now evident, the device of the present invention fulfills the objects heretofore mentioned. The device permits the molding of plastic materials, such as rigid polyvinyl acetate and polystyrene, without the disadvantages of cold weld and flow lines due to the even temperatures through the section of melted plastic. Articles having very thin sections may be molded with the injection molding apparatus of the present invention, as there is no appreciable loss in injection pressure across the heating chamber nor is there any decomposition of the plastic material.

The terminology used in this specification is for the purpose of description and not limitation, the scope of the invention being defined in the claims.

I claim:
1. In an injection molding device of the type having a piston reciprocable in a feed bushing for advancing a charge of plastic material in a solid state to a heating chamber where the material is plasticized and then delivering the plasticized material in a stream to a mold: a heating device comprising a heating cylinder for attachment at one end thereof to the feed bushing and having a frusto-conical passage therethrough, said frusto-conical passage having its smallest diameter corresponding to the diameter of the feed bushing bore and positioned at the end of the heating cylinder which is adapted to be connected to the feed bushing, a torpedo member, said torpedo member including a body portion adapted to telescope within the frusto-conical passage of said heating cylinder toward the feed bushing and an enlarged head at the forward end of the body portion being detachably connected to the end of said heating cylinder, said body portion being conical and spaced from the surface of and having a steeper pitch than the pitch of the surface of the frusto-conical passage in said heating cylinder, and means provided on the outer surface of said conical body portion and extending substantially longitudinally thereof whereby the space between the surface of the body portion and the frusto-conical passage in said heating cylinder defines a heating chamber having substantially the same transverse cross-sectional area and an increased surface area from the feed bushing end toward the torpedo head, said last-mentioned means including streamlined fins projecting radially outward therefrom and abutting the surface of the frusto-conical pasage in said heating cylinder and longitudinally extending ribs positioned between said fins and spaced from the surface of the frusto-conical passage in the heating chamber, said ribs fairing into the body portion of said torpedo member adjacent its junction with said head, said torpedo head having a plurality of converging bores extending from the periphery of the body portion at its junction with the head forwardly and inwardly, said bores converging into a passageway provided axially of the torpedo head, and an injection nozzle to be carried by said head and cooperating with the axial passageway therein.

2. An injection molding device of the character described in claim 1, whereby said ribs have a pitch at least equal to the pitch of the conical body portion of said torpedo member.

References Cited in the file of this patent
UNITED STATES PATENTS 2,192,263   Johnson _____ Mar. 5, 1940
2,308,867   Dinzl _____ Jan. 19, 1943

FOREIGN PATENTS 702,317   Great Britain _____ Jan. 13, 1954